(12) United States Patent
Alms et al.

(10) Patent No.: US 10,647,065 B2
(45) Date of Patent: May 12, 2020

(54) METHOD OF MAKING A COMPOSITE ARTICLE

(71) Applicant: SIKORSKY AIRCRAFT CORPORATION, Stratford, CT (US)

(72) Inventors: Justin B. Alms, Glastonbury, CT (US); Eric J. Amis, Akron, OH (US); Joseph J. Sangiovanni, West Suffield, CT (US); Ellen Y. Sun, South Windsor, CT (US); Aaron T. Nardi, East Granby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 447 days.

(21) Appl. No.: 15/327,079

(22) PCT Filed: Jul. 31, 2015

(86) PCT No.: PCT/US2015/043233
§ 371 (c)(1),
(2) Date: Jan. 18, 2017

(87) PCT Pub. No.: WO2016/064460
PCT Pub. Date: Apr. 28, 2016

(65) Prior Publication Data
US 2017/0165906 A1 Jun. 15, 2017

Related U.S. Application Data

(60) Provisional application No. 62/031,741, filed on Jul. 31, 2014.

(51) Int. Cl.
*B29C 65/00* (2006.01)
*B32B 5/26* (2006.01)
(Continued)

(52) U.S. Cl.
CPC .......... *B29C 66/742* (2013.01); *B29C 66/721* (2013.01); *B32B 5/22* (2013.01);
(Continued)

(58) Field of Classification Search
CPC .. C23C 24/04; B32B 5/02; B32B 5/22; B32B 5/26; B32B 2255/02; B32B 2255/205;
(Continued)

(56) References Cited

U.S. PATENT DOCUMENTS

| 8,247,050 B2 | 8/2012 | McCrea et al. |
| 8,394,473 B2 | 3/2013 | McCrea et al. |

(Continued)

FOREIGN PATENT DOCUMENTS

| FR | 2995323 A1 | 3/2014 |
| WO | 2014020439 A2 | 2/2014 |

OTHER PUBLICATIONS

European Search Report for EP Application No. 15853467.7 dated Feb. 13, 2018; 7 pages.

(Continued)

*Primary Examiner* — Vishal I Patel
(74) *Attorney, Agent, or Firm* — Cantor Colburn LLP

(57) ABSTRACT

A method of making a composite article involves first forming an intermediate substrate. The intermediate substrate can be formed from fibers and an uncured thermoset polymer composition followed by partial cure, or from fibers and an uncured thermoset polymer composition followed by cure of the thermoset polymer composition and deposition of a thermoplastic on the surface of the substrate, or from fibers and an uncured thermoset polymer composition followed by cure and exposure of the substrate to organic solvent, a plasticizer, moisture, and/or heat. The intermediate substrate prepared according to any of the above techniques is then subjected to cold gas spray deposition to (Continued)

deposit a metal layer onto the intermediate substrate. In the case where the substrate was formed by partially curing a thermoset polymer composition, the metal-coated partially-cured thermoset polymer substrate is then fully cured.

15 Claims, 2 Drawing Sheets

(51) Int. Cl.
    B32B 5/22      (2006.01)
    B32B 7/12      (2006.01)
    B32B 15/08     (2006.01)
    B32B 15/20     (2006.01)
    C23C 24/04     (2006.01)
    B32B 5/02      (2006.01)
(52) U.S. Cl.
    CPC .......... B32B 5/26 (2013.01); B32B 7/12
        (2013.01); B32B 15/08 (2013.01); B32B 15/20
        (2013.01); C23C 24/04 (2013.01); B32B 5/02
        (2013.01); B32B 2250/42 (2013.01); B32B
        2255/02 (2013.01); B32B 2255/205 (2013.01);
        B32B 2260/021 (2013.01); B32B 2260/046
        (2013.01); B32B 2262/0269 (2013.01); B32B
        2262/10 (2013.01); B32B 2262/101 (2013.01);
        B32B 2262/103 (2013.01); B32B 2262/105
        (2013.01); B32B 2262/106 (2013.01); B32B
        2262/14 (2013.01); B32B 2307/202 (2013.01);
        B32B 2307/302 (2013.01); B32B 2307/306
        (2013.01); B32B 2307/50 (2013.01); B32B
        2307/554 (2013.01); B32B 2307/718
        (2013.01); B32B 2605/00 (2013.01)
(58) Field of Classification Search
    CPC ........ B32B 2260/021; B32B 2260/046; B32B
        2262/0269; B32B 2262/10; B32B
        2262/101; B32B 2262/103; B32B
        2262/105; B32B 2262/106; B32B
        2262/14; B32B 2307/202; B32B
        2307/302; B32B 2307/306; B32B
        2307/50; B32B 2307/554; B32B
        2307/718; B32B 2605/00; B32B 15/20;
        B32B 15/08; B32B 7/12; B29C 66/721;
        B29C 66/742
    See application file for complete search history.

(56)            References Cited

U.S. PATENT DOCUMENTS 8,394,507 B2      3/2013  Tomantschger et al.
    2009/0029180 A1   1/2009  Oguri et al.
    2010/0304171 A1   12/2010 Tomantschger et al.
    2013/0122763 A1*  5/2013  Fish .................... B32B 5/022
                                                              442/59
    2013/0143058 A1*  6/2013  McCrea ................. C08J 7/04
                                                             428/551
    2014/0154496 A1   6/2014  Sang et al.

OTHER PUBLICATIONS

Browing, et al. "Moisture Effects in Epoxy Matrix Composites," Technical Report from Mechanics and Surface Interactions Branch Nounmetallic Materials Division; Jan. 24, 1978; 36 Pages; Wright-Patterson Air Force Base, Ohio USA.
International Search Report and Written Opinion; International Filing Application No. PCT/US2015/43233; International Filing Date: Jul. 31, 2015; dated May 12, 2016, 12 Pages.
Robitaille, et al. "Metallic Coating of Aerospace Carbon/Epoxy Composites by the Pulsed Gas Dynamic spraying Process," Article in Surface & Coatings Technology; 2009; 7 Pages; 2009 Elsevier B.V.; Canada; www.elsevi e r.com/locate/surfcoat.
Zhou, et al. "Preparation of Metallic Coatings on Polymer Matrix Composites by Cold Spray," Article in Surface & Coatings Technology; 2011; 5 Pages; 2011 Elsevier B.V.; Canada; www.elsevi e r.com/locate/surfcoat.

* cited by examiner

METHOD OF MAKING A COMPOSITE ARTICLE

CROSS REFERENCE TO RELATED APPLICATIONS

This application is a National Stage Application of PCT Application No. PCT/US2015/043233, filed on Jul. 31, 2015, which in turn claims priority to U.S. Provisional Patent Application Ser. No. 62/031,741, filed Jul. 31, 2014. The entire contents of PCT Application No. PCT/US2015/043233, and U.S. Provisional Patent Application Ser. No. 62/031,741, are incorporated herein by reference in their entirety.

BACKGROUND OF THE INVENTION

Metals such as aluminum alloys have been widely used for years as structural components in various applications such as aircraft, motor vehicles, and countless other applications. More recently, composite materials such as carbon fiber reinforced polymer (CFRP) have been used. These composite materials can provide advantages in strength to weight ratio, and they have been increasingly deployed as replacement materials for metal in structural components. However, composite materials cannot be used as a universal replacement for metal, as they suffer from other limitations associated with electrical conductivity or poor heat resistance, which necessitate the continued use of metal components in applications where electrical conductivity, heat resistance, abrasion resistance, or other properties commonly associated with metals are required. Accordingly, in many applications, both metal materials and composite materials are used in proximity to one another and must often be connected together.

The connection of composite materials to metal presents a number of technical challenges. Conventional techniques, such as attaching a metal sheath or a metal article to a composite surface with adhesive, are subject to a variety of bond failure modes, including adhesive failure at either the metal-adhesive interface or at the composite-adhesive interface and/or cohesive failure of the adhesive itself. These failure modes can be promoted by exposure of the adhesive bond to extreme conditions such as temperature, radiation, or moisture. Direct application of metal coatings through spray techniques such as cold spray can cause significant erosion of the relatively brittle thermoset resins used in the composite materials to the point where the loss of material from such erosion overwhelms any adhesion of any metal to the composite substrate.

In view of the above, there remains a need to develop alternative materials and techniques for bonding or connecting composite materials and metals.

BRIEF DESCRIPTION OF THE INVENTION

According the invention, a method of making a composite article comprises first forming an intermediate substrate. In some aspects of the invention, the intermediate substrate is formed from fibers and an uncured thermoset polymer composition, and then the thermoset polymer composition is partially cured. In some aspects of the invention, the intermediate substrate is formed from fibers and an uncured thermoset polymer composition, the thermoset polymer composition is cured, and a thermoplastic surface layer is deposited on the surface of the substrate. In some aspects of the invention, the intermediate substrate is formed from fibers and an uncured thermoset polymer composition, the thermoset polymer composition is cured, and a surface of the substrate is exposed to organic solvent, a plasticizer, moisture, and/or heat. The intermediate substrate prepared according to any of the above techniques is then subjected to cold gas spray deposition to deposit a metal layer onto the intermediate substrate. In the case where the substrate was formed by partially curing a thermoset polymer composition, the metal-coated partially-cured thermoset polymer substrate is then fully cured.

In some aspects of the invention, the intermediate substrate is prepared by partially curing a thermoset polymer composition and the uncured thermoset polymer composition is partially cured in bulk (i.e., the thermoset polymer composition throughout the entire substrate can be subjected to conditions to bring about a partial cure).

In some aspects of the invention, the intermediate substrate is prepared by partially curing a thermoset polymer composition, specifically by depositing a layer of uncured thermoset polymer composition onto a substrate comprising fibers and cured thermoset polymer composition, and partially curing the uncured thermoset polymer composition.

In some aspects of the invention, the intermediate substrate is prepared by partially curing a thermoset polymer composition, specifically by forming a substrate comprising fibers and a first uncured thermoset polymer composition having a surface layer comprising a second uncured thermoset polymer composition having a cure temperature higher than the cure temperature of the first thermoset polymer composition, and applying heat to cure the first thermoset polymer composition and to partially cure the second thermoset polymer composition.

In some aspects of the invention, the intermediate substrate is prepared by forming a substrate comprising a cured thermoset polymer composition having a surface layer thereon comprising a thermoplastic.

In some aspects of the invention, the thermoset polymer composition comprises a curable epoxy resin composition, a curable polyurethane composition, a curable polyester composition, a curable polyimide composition, a curable bismaleimide composition, a curable phenolic composition, a curable polycarbosilane composition, or mixtures comprising any of the foregoing.

In some aspects of the invention, the thermoset polymer composition comprises a curable epoxy resin composition.

In some aspects of the invention, the fibers include carbon fibers, aramid fibers, silicon carbide fibers, nanofibers, metallic fibers, glass fibers, or mixtures comprising any of the foregoing.

In some aspects of the invention, the intermediate substrate comprises a surface layer comprising the thermoset polymer composition and glass, ceramic, or aramid fibers over an underlying substrate comprising the thermoset polymer composition and electrically conductive fibers, wherein the surface layer provides a resistance of at least $10^6$ ohms between the surface thereof and the underlying substrate.

In some aspects of the invention, the intermediate substrate is initially formed from a plurality of fiber mats or fiber sheets impregnated with uncured thermoset polymer composition.

In some aspects of the invention, the method further comprises attaching a metal component to the cold gas spray-applied metal layer. In some aspects of the invention, the metal component and the metal layer have an electrochemical potential difference of less than or equal to 100 mV. In some aspects of the invention, the metal component and the metal layer each comprise the same metal

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

FIG. 2 is a schematic depiction of a cross-section view of a composite article having a metal layer deposited thereon, bonded to a metal article; and.

DETAILED DESCRIPTION OF THE INVENTION

Figure 1:
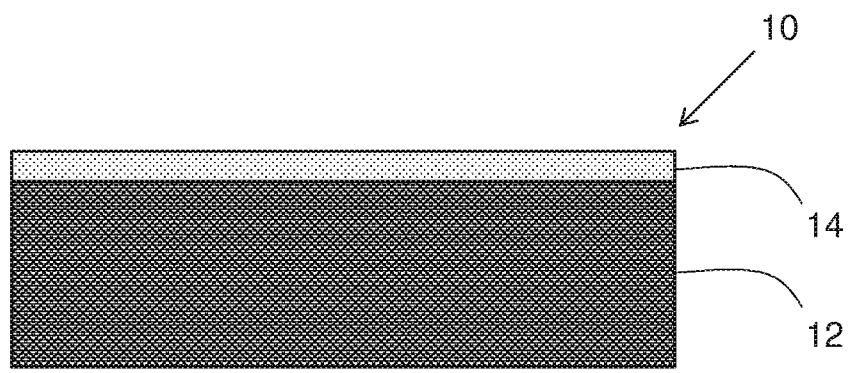
FIG. 1 is a schematic depiction of a cross-section view of a composite article having a metal layer deposited thereon.

With reference to the Figures, FIG. 1 depicts a cross-section view of a composite article having a metal layer thereon. As shown in FIG. 1, article 10 includes a composite substrate 12 having thereon a metal layer 14. Composite substrate 12 includes fibers disposed in a resin matrix. Carbon fibers are often used for their beneficial strength to weight ratio, but other fibers can be used as well. For example, in some embodiments, inorganic fibers such as metal (e.g., steel, titanium), glass, or ceramic fibers are used, and can provide beneficial properties such as high stiffness and strength, as well as durability and ability to withstand sever processing conditions. Examples of specific inorganic materials include glass fibers such as E-glass, S-glass, etc., or ceramics such as silicon carbide. Organic polymeric fibers such as aramid fibers (e.g., AABB para-polyaramide or poly(p-phenylene terephthalamide)) can also be used.

The thermoset polymer composition used as the matrix of the composite material can be any of a number of known curable resin systems, including epoxy resins, polyurethane resins, polyester resins, polyimide resins, bismaleimide resins, phenolic resins, polycarbosilane resins, or mixtures comprising any of the foregoing (mixtures with each other or other resins or materials). In some embodiments, the thermoset polymer composition is an epoxy resin such as Hexcel 8552, Hexcel M91, Cytec™ Cycom™ 970, and others. In some embodiments, the thermoset polymer composition used as the matrix is prepared with structural, electrical, or thermal property enhancing nano-additives. Composite components can be prepared using a variety of techniques, as is known in the art.

The fibers can range in size from nanoscopic (i.e., nanofibers, which can have a diameter as low as 10 nm) up through 100 µm. The fibers can be chopped fibers that are dispersed in a binder that is in powder or fluid form and the binder is molded and cured. For example, the fibers can be dispersed among the reactive components of the thermoset polymer composition, which are then cured to form the fiber-reinforced composite material. In some embodiments, a pre-formed fiber mat is impregnated with an uncured fluid thermoset polymer composition, which is then cured or otherwise solidified to form the fiber-reinforced composite material. This article, also called a pre-preg or pre-form, can then be incorporated into a layup on a mold, optionally along with other pre-forms or pre-pregs, and subjected to heat and/or pressure to cure the resin, thereby forming the fiber-reinforced composite.

As mentioned above, in some aspects of the invention, the intermediate substrate is formed from fibers and an uncured thermoset polymer composition, and then the thermoset polymer composition is partially cured. The partial cure can be carried out by subjecting the thermoset polymer composition to an elevated temperature less than the temperature needed to fully cure the thermoset polymer composition, or by subjecting the composition to heating for a time period less than that needed for full cure. Curing and partial curing can also be carried out by exposure to radiation such as UV light. In some embodiments, the partial cure produces an intermediate substrate material having elongation to failure ranging from 20% to 60%, as determined according to ASTM D638-10. The partial cure conditions can be applied to the bulk of the substrate (i.e., the thermoset polymer composition throughout the entire substrate can be subjected to conditions to bring about a partial cure), or to a surface layer or skin portion of the substrate. In some embodiments involving a surface layer or skin portion of the substrate, the intermediate substrate is formed by depositing a layer of uncured thermoset polymer composition onto a substrate comprising fibers and cured thermoset polymer composition, and partially curing the uncured thermoset polymer composition. This approach can provide for more precise control of the degree of partial cure than bulk partial curing. Another approach involving a surface layer or skin portion of the substrate involves forming a substrate comprising fibers and a first uncured thermoset polymer composition having a surface layer comprising a second uncured thermoset polymer composition having a cure temperature higher than the cure temperature of the first thermoset polymer composition. The higher cure temperature surface layer can be included in the lay-up of pre-pregs where fiber mats disposed at and adjacent to the surface of the pre-preg lay-up are impregnated with a higher cure temperature thermoset polymer than in the rest of the pre-pregs. Alternatively, the higher cure temperature thermoset polymer can be applied to the surface of a pre-formed substrate of lower cure temperature thermoset polymer.

In some aspects of the invention, the intermediate substrate is formed from fibers and an uncured thermoset polymer composition, the thermoset polymer composition is cured, and a thermoplastic surface layer is deposited on the surface of the substrate. In some embodiments, the thermoplastic material is a poly aryl ether ketone (PAEK), such as poly ether ether ketone (PEEK), polyethylene, and polyetherimide.

In some aspects of the invention, the intermediate substrate is formed from fibers and an uncured thermoset polymer composition, the thermoset polymer composition is cured, and a surface of the substrate is exposed to organic solvent, a plasticizer, moisture, and/or heat. These surface treatments can reduce hardness and brittleness at the surface of the substrate, making it more amenable to application of metal by cold gas spray deposition. These treatments can be used singly or in combination. For example, cured epoxy thermoset polymer resins can be softened by exposure to toluene at temperatures from 30° C. to 60° C., or to moisture (e.g., 95% relative humidity) at elevated temperatures (e.g., 149° C.). Of course, the precise surface treatment materials and conditions will vary depending on the particular thermoset resin involved as will be understood by one skilled in the art. Useful organic solvents for surface treatments include toluene and acetone. Useful plasticizers for surface treatments can include phthalate ester-based plasticizers, trimellitates, or adipate-based plasticizers.

After preparation of the intermediate substrate as described above, a metal layer is deposited thereon using cold gas spray deposition (CGSD). In a cold spray process, unmelted metal particles are introduced into a high velocity gas stream being projected out of a high velocity (e.g., supersonic) nozzle toward the coating substrate target. The particles' kinetic energy provides sufficient heat on impact with the coating substrate such that the particles plastically deform and fuse with the substrate and surrounding deposited metal material. As the particles impact the substrate, they rapidly cool even as the particles are deforming. The particles change shape dramatically from relatively round to very thin flat splats on the surface. After CGSD application of the metal layer to the intermediate substrate, the article is subjected to further curing, if necessary, to fully cure any partially-cured thermoset polymer composition, using cure conditions specific to the particular thermoset polymer composition.

The metal-coated composite article prepared as described above can be used as a stand-alone component, for example, a composite article where a metal surface layer or skin provides electrical conductivity (e.g., for dissipating lightning strikes) or thermal conductivity (e.g., for heat dissipation to a heat sink), or it can be used as a foundation component to which other components can be attached.

In some embodiments, the other component(s) that can be attached to the metal layer is a metal component, for example a metal component attached to a CFRP substrate. The carbon fibers used in CFRP are electrically conductive, and CFRP material itself is therefore electrically conductive as well. However, CFRP has a different electrochemical potential than metals such as aluminum alloys to which it may be attached. In the presence of moisture, an electrochemical cell can be formed by CFRP and metal components, which leads to galvanic corrosion of the metal. Attempts have been made to electrically insulate bonded CFRP and metal components from one another. For example, the use of thicker layers of electrically insulating polymer adhesives has been proposed. Polymer adhesives, however, may not function at their optimum levels when used at thicknesses dictated by the need to provide electrical insulation, and they can have their physical properties adversely affected by exposure to environmental conditions such as heat, cold, moisture, solvents, etc., which can cause cracks, holes, or other deformation in the adhesive bond where moisture can penetrate, leading to galvanic corrosion. In some embodiments, the invention addresses this problem by providing a tightly-sealed metal layer applied to the composite article so that moisture cannot penetrate to cause galvanic corrosion, and the CGSD-applied metal can be selected to have an electrochemical potential that is the same as or close to that of the metal article or component so that galvanic corrosion is reduced or eliminated. In some embodiments, the metal component and the metal layer have an electrochemical potential difference of less than or equal to 100 mV. In some embodiments, the metal component and the metal layer are made from the same metal.

Figure 2:
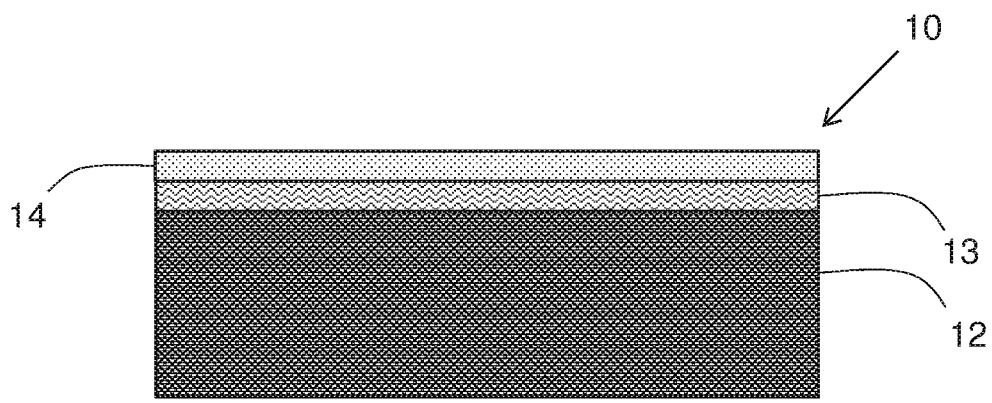

In some aspects of the invention, the intermediate substrate includes at least a surface layer comprising a thermoset polymer composition and glass, ceramic, or aramid fibers. In some embodiments, the entire intermediate substrate can be formed from a thermoset polymer composition and glass, ceramic, or aramid fibers. In other embodiments, a surface layer comprising a thermoset polymer composition and glass, ceramic, or aramid fibers is disposed over an underlying substrate comprising thermoset polymer composition and electrically conductive fibers as shown in FIG. 2, which has similar layers as in FIG. 1 with the addition of surface layer 13 comprising glass, ceramic, or aramid fibers over underlying substrate 12 comprising thermoset polymer composition and conductive fibers such as carbon fibers. The intermediate substrate can be readily formed, for example, using prepreg composite layup techniques where a number of carbon fiber prepregs are arranged with one or more glass fiber prepregs disposed as outer layer(s) followed by partial cure of the thermoset polymer composition. Such an arrangement can provide electrical resistance (e.g., at least $10^6$ ohms) between the metal layer 14 disposed at the upper surface of layer 13, and the underlying conductive fiber-containing substrate 12.

Figure 3:
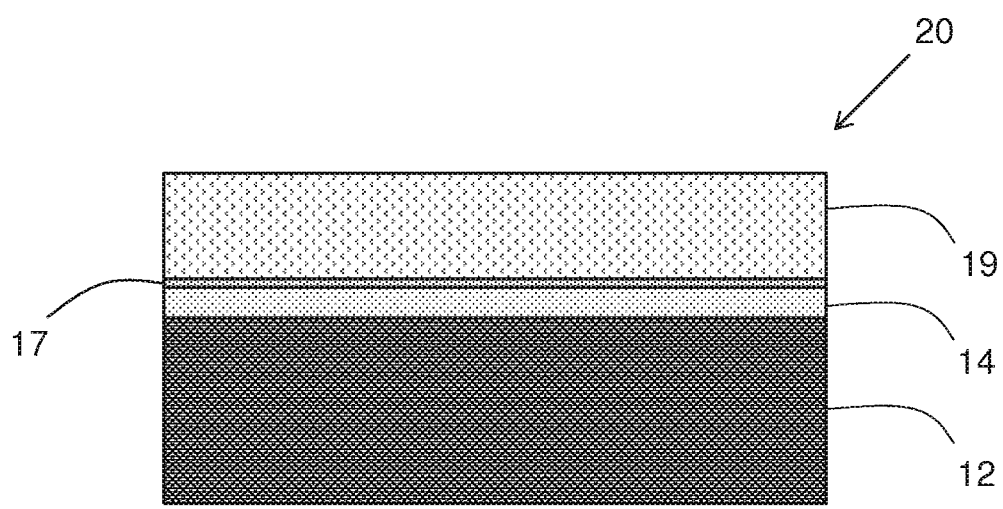
FIG. 3 is a schematic depiction of a cross-section view of a composite article having an electrically insulating layer and a metal layer deposited thereon.

An exemplary embodiment of a metal article connected to a composite article as described above is schematically depicted in FIG. 3. Similar to that shown in FIG. 1, composite substrate 12 has a metal layer 14 thereon. As further shown in FIG. 3, metal component 19 is bonded to the metal layer 14 of component 10 (FIG. 1) with adhesive 17.

The metal substrate 14 can be formed of any metal. Exemplary metals include aluminum or an aluminum alloy such as series 1000 to 8000 aluminum alloys. Pure aluminum, which is series 1000, can provide formability and corrosion resistance, and Al—Cu—Mg alloys (series 2000) provide enhanced strength and toughness. Al—Mn alloys (series 3000) also offer formability properties while Al—Si alloys (series 4000) are characterized by high strength. Al—Mg alloys can provide formability, while series 6000 Al—Mg—Si alloys can provide strength, toughness, formability and corrosion resistance. Series 7000 Al—Zn(—Mg) alloys also provide strength and toughness. One skilled in the art can readily choose an appropriate aluminum or other alloy based on product design (i.e., the degree of formability) and specifications (physical properties, e.g., strength).

Various adhesive compounds and compositions can be used as adhesive 17. Examples of adhesives include epoxy adhesives, acrylic adhesives, urethane adhesives, silicone adhesives, etc. Adhesives can utilize various curing mechanisms, including polymerization and/or crosslinking, which can be initiated and/or promoted via radiation, heat, moisture, or which may proceed spontaneously in the case of reactive component mixtures mixed immediately prior to application. Adhesives can also cure by solvent evaporation or, in the case of hot melt adhesives, by cooling.

NUMBERED EMBODIMENTS

The following numbered embodiments are disclosed to provide written disclosure support for multiple dependent claims in various designated States:

Embodiment 1

A method of making a composite article, comprising:
(1) preparing an intermediate substrate by:
(i) forming a substrate comprising fibers and an uncured thermoset polymer composition and reinforcing fibers, and partially curing the thermoset polymer composition;
(ii) forming a substrate comprising fibers and an uncured thermoset polymer composition, curing the thermoset polymer composition, and depositing a thermoplastic surface layer thereon; or
(ii) forming a substrate comprising fibers and an uncured thermoset polymer composition, curing the thermoset polymer composition, and exposing a surface of the substrate to an organic solvent, a plasticizer, moisture, and/or heat;

(2) depositing a metal layer onto the intermediate substrate with cold gas spray deposition; and (3) if the substrate is processed according to (i), fully curing the substrate having the metal layer thereon.

Embodiment 2

The method of Embodiment 1, wherein the intermediate substrate is prepared by forming a substrate comprising an uncured thermoset polymer composition and partially curing the thermoset polymer composition.

Embodiment 3

The method of Embodiment 2, wherein the uncured thermoset polymer composition is partially cured in bulk.

Embodiment 4

The method of Embodiment 2, wherein the intermediate substrate is prepared by depositing a layer of uncured thermoset polymer composition onto a substrate comprising fibers and cured thermoset polymer composition, and partially curing the uncured thermoset polymer composition.

Embodiment 5

The method of Embodiment 2, wherein the intermediate substrate is prepared by forming a substrate comprising fibers and a first uncured thermoset polymer composition and reinforcing fibers having a surface layer comprising a second uncured thermoset polymer composition having a cure temperature higher than the cure temperature of the first thermoset polymer composition, and applying heat to cure the first thermoset polymer composition and to partially cure the second thermoset polymer composition.

Embodiment 6

The method of Embodiment 1, wherein the intermediate substrate is prepared by forming a substrate comprising a cured thermoset polymer composition having a surface layer thereon comprising a thermoplastic.

Embodiment 7

The method of Embodiment 1, wherein the intermediate substrate is prepared by forming a substrate comprising a cured thermoset polymer composition and exposing a surface of the substrate to an organic solvent, a plasticizer, moisture, and/or heat.

Embodiment 8

The method of any of Embodiments 1-7, wherein the thermoset polymer composition comprises a curable epoxy resin composition, a curable polyurethane composition, a curable polyester composition, a curable polyimide composition, a curable bismaleimide composition, a curable phenolic composition, a polycarbosilane composition, or mixtures comprising any of the foregoing.

Embodiment 9

The method of Embodiment 8, wherein the thermoset polymer composition comprises a curable epoxy resin composition.

Embodiment 10

The method of any of Embodiments 1-9, wherein the fibers include carbon fibers, aramid fibers, silicon carbide fibers, nanofibers, metallic fibers, glass fibers, or mixtures comprising any of the foregoing.

Embodiment 11

The method of any of Embodiments 1-10, wherein the intermediate substrate comprises a surface layer comprising the thermoset polymer composition and glass, ceramic, or aramid fibers over an underlying substrate comprising the thermoset polymer composition and electrically conductive fibers, wherein the surface layer provides a resistance of at least $10^6$ ohms between the surface thereof and the underlying substrate.

Embodiment 12

The method of any of Embodiments 1-11, wherein the intermediate substrate is formed from a plurality of fiber mats or sheets impregnated with the uncured polymer resin composition.

Embodiment 13

The method of any of Embodiments 1-12, further comprising attaching a metal component to the cold gas spray-applied metal layer.

Embodiment 14

The method of Embodiment 13, wherein the metal component and the metal layer have an electrochemical potential difference of less than or equal to 100 mV.

Embodiment 15

The method of Embodiment 14, wherein the metal component and the metal layer each comprise the same metal.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method of making a composite article, comprising:
(1) preparing an intermediate substrate by:

(i) forming a substrate comprising fibers and an uncured thermoset polymer composition, and partially curing the thermoset polymer composition to produce an intermediate substrate material having elongation to failure ranging from 20 to 60%, as determined accordingly to ASTM D638-10;

(ii) forming a substrate comprising fibers and an uncured thermoset polymer composition, curing the thermoset polymer composition, and depositing a thermoplastic surface layer thereon; or (iii) forming a substrate comprising fibers and an uncured thermoset polymer composition, curing the thermoset polymer composition, and exposing a surface of the substrate to an organic solvent, a plasticizer, moisture, and/or heat;

(2) depositing a metal layer onto the intermediate substrate with cold gas spray deposition; and (3) if the substrate is processed according to (i), fully curing the substrate having the metal layer thereon, wherein the thermoset polymer composition comprises a curable epoxy resin composition, a curable polyurethane composition, a curable polyester composition, a curable polyimide composition, a curable bismaleimide composition, a curable phenolic composition, a polycarbosilane composition, or mixtures comprising any of the foregoing; and the intermediate substrate comprises a surface layer comprising the thermoset polymer composition and glass, ceramic, or aramid fibers over an underlying substrate comprising the thermoset polymer composition and electrically conductive fibers, wherein the surface layer provides a resistance of at least $10^6$ ohms between the surface thereof and the underlying substrate.

2. The method of claim 1, wherein the intermediate substrate is prepared by forming a substrate comprising an uncured thermoset polymer composition and partially curing the thermoset polymer composition.

3. The method of claim 2, wherein the uncured thermoset polymer composition is partially cured in bulk.

4. The method of claim 2, wherein the intermediate substrate is prepared by depositing a layer of uncured thermoset polymer composition onto a substrate comprising fibers and cured thermoset polymer composition, and partially curing the uncured thermoset polymer composition.

5. A method of making a composite article, comprising:
(1) preparing an intermediate substrate by:

forming a substrate comprising fibers and a first uncured thermoset polymer composition having a surface layer comprising a second uncured thermoset polymer composition having a cure temperature higher than the cure temperature of the first thermoset polymer composition, and applying heat to cure the first thermoset polymer composition and to partially cure the second thermoset polymer composition; and (2) depositing a metal layer onto the intermediate substrate with cold gas spray deposition; and (3) fully curing the substrate having the metal layer thereon.

6. The method of claim 1, wherein the intermediate substrate is prepared by forming a substrate comprising a cured thermoset polymer composition having a surface layer thereon comprising a thermoplastic.

7. The method of claim 1, wherein the intermediate substrate is prepared by forming a substrate comprising a cured thermoset polymer composition and exposing a surface of the substrate to an organic solvent, a plasticizer, moisture, and/or heat.

8. The method of claim 1, wherein the second thermoset polymer composition comprises a curable epoxy resin composition.

9. The method of claim 1, wherein the fibers include carbon fibers, aramid fibers, silicon carbide fibers, nanofibers, metallic fibers, glass fibers, or mixtures comprising any of the foregoing.

10. The method of claim 1, wherein the intermediate substrate is formed from a plurality of fiber mats or sheets impregnated with the uncured polymer resin composition.

11. The method of claim 1, further comprising attaching a metal component to the cold gas spray-applied metal layer.

12. The method of claim 11, wherein the metal component and the metal layer have an electrochemical potential difference of less than or equal to 100 mV.

13. The method of claim 12, wherein the metal component and the metal layer each comprise the same metal.

14. The method of claim 1, wherein the thermoset polymer composition comprises a polycarbosilane composition.

15. The method of claim 1, wherein the surface layer comprising the thermoset polymer composition and aramid fibers.

* * * * *